No. 741,653. Patented October 20, 1903.

UNITED STATES PATENT OFFICE.

SOLOMON GANELIN, OF BERLIN, GERMANY.

PROCESS OF TREATING LEAD, SILVER, OR ZINC ORES.

SPECIFICATION forming part of Letters Patent No. 741,653, dated October 20, 1903.

Application filed January 25, 1900. Renewed July 17, 1903. Serial No. 166,046. (No specimens.)

*To all whom it may concern:*

Be it known that I, SOLOMON GANELIN, a citizen of the United States, and a resident of Berlin, Germany, have invented a new and Improved Process of Treating Ores and Substances Containing Lead, Silver, and Zinc, of which the following is a full, clear, and exact description.

My invention relates to the treatment of ores or substances containing lead, silver, or zinc, and has for its object to provide a simple and economical process for the recovery of the above-named metals, either as oxids, oxychlorids, or in a metallic state.

My improved process is based upon the property of certain salts, such as chlorids or double salts thereof, &c., to dissolve when in a molten condition considerable amounts of metallic oxids, particularly of oxids of lead, silver, and zinc. These molten masses permit of recovering the metals from them by electrolysis or by treatment with metallic zinc or lead, and, further, when dissolved in water the mass will yield up the major portion of the oxids as a residue insoluble in water. These properties afford means for obtaining the final product either in the metallic state or as oxids, or perhaps, oxychlorids.

I proceed as follows: The ores or substances containing one or more of the above-named metals are first, if required, heated or roasted for the purpose of converting the metallic compounds they contain into oxids. This step is of course superfluous when the ores or substances contain the metals as oxids, but is required in case of carbonates or sulfids, such as zinc-blendes (ZnS) or zinc-spar ($ZnCO_3$) or lead-zinc ores, such as the well-known ores of Broken Hill, (New South Wales.) After bringing the ores into the condition of oxids they are mixed with a molten mass, preferably molten double chlorid of zinc and sodium, until the oxids of the ore have become thoroughly dissolved in the said molten mass and the rest of the ore remains undissolved. By this reaction these oxids are probably converted into chlorids or oxychlorids or basic salts as expressed in the following equations:

(1) $2PbO + ZnCl_2 = PbO.PbCl_2 + ZnO$.
(2) $Ag_2O + ZnCl_2 = 2AgCl + ZnO$.

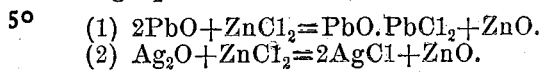

The molten mass is then removed by decanting, filtering, or otherwise separating it from those parts of the ore which are insoluble in said chlorids, such as silicates or gangue, and after cooling the mass thus freed from the gangue, &c., is dissolved in water. The result is a solution of the salt originally employed and a water-insoluble precipitate containing the major portion of the metallic oxids. By filtering and leaching the precipitated oxids or oxychlorids can be separated therefrom, while the solution may be treated by evaporation to recover the original double salt, which may thus be used over and over again.

Instead of separating the lead, silver, or zinc as oxids or oxychlorids from the molten mass they can be obtained in the metallic state. In this case the molten mass (with the gangue, silicates, or other insoluble substances or after the removal of such substances) is electrolyzed, causing the metals to be deposited upon the cathode in succession—for instance, first silver, then lead, and then zinc—while oxygen is liberated at the anode.

In this method the metal to be separated must not be more basic than the metal the salt of which is used for dissolving the oxid of the first-mentioned metal. If, for instance, zinc oxid is dissolved in molten lead chlorid, the zinc could not be recovered, for at the moment of its separation the zinc would act on the lead chlorid, forming zinc chlorid and causing the separation of lead instead of zinc.

The recovery of the metal proper from the molten mass, and particularly the recovery of lead and silver, may also be brought about by precipitation by means of some other suitable metal—for instance, metallic zinc. For this purpose I add to the above-described molten mass containing the oxids in solution an amount of zinc slightly in excess of the quantity indicated by the equation:

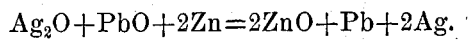

$Ag_2O + PbO + 2Zn = 2ZnO + Pb + 2Ag$.

Having thus described my invention, I claim as new and desire to secure by Letters Patent—

1. The herein-described process for the treatment of ores and substances containing metallic oxids, particularly those of silver, lead or zinc, which consists in mixing said substances with a molten salt capable of dissolving the said oxids from the rest of the ore and then separating the metallic substances from said salt and the rest of the ore.

2. The herein-described process for the treatment of ores or substances containing metallic oxids, particularly those of silver, lead or zinc, which consists in mixing said substances with a molten salt capable of dissolving the said oxids from the rest of the ore and then recovering the metals of said oxids, substantially as described.

In testimony whereof I affix my signature in presence of two witnesses.

SOLOMON GANELIN.

Witnesses:
WOLDEMAR HAUPT,
MAX. C. STAEHLER.